(12) United States Patent
Scheiding

(10) Patent No.: US 6,289,082 B1
(45) Date of Patent: Sep. 11, 2001

(54) STROBE LIGHT AND EMERGENCY CALL WARNING DEVICE WITH REMOTE ACTIVATOR

(76) Inventor: David Scheiding, 8516 Graw Rd., Arcanum, OH (US) 45304

( * ) Notice: Subject to any disclaimer, the term of this patent is extended or adjusted under 35 U.S.C. 154(b) by 0 days.

(21) Appl. No.: 09/615,692

(22) Filed: Jul. 18, 2000

(51) Int. Cl.[7] .................................................. H04M 11/04
(52) U.S. Cl. .................. 379/37; 379/38; 379/45
(58) Field of Search .......................................... 379/37–51

(56) References Cited

U.S. PATENT DOCUMENTS

| | | |
|---|---|---|
| 3,911,425 | 10/1975 | Muncheryan . |
| 3,913,092 | 10/1975 | Klingenberg . |
| 4,219,698 | 8/1980 | Birilli et al. . |
| 4,417,100 | 11/1983 | Carlson et al. . |
| 4,547,761 | 10/1985 | Jones . |
| 4,878,236 | 10/1989 | Ray et al. . |
| 4,931,780 | 6/1990 | LaMont et al. . |
| 4,993,058 | 2/1991 | McMinn et al. . |
| 5,012,507 * | 4/1991 | Leighton et al. ....................... 379/37 |
| 5,621,379 | 4/1997 | Collins . |
| 5,673,304 * | 9/1997 | Connor et al. .......................... 379/40 |
| 5,710,803 * | 1/1998 | Kowal et al. ........................... 379/43 |
| 5,729,197 * | 3/1998 | Cash ....................................... 379/42 |
| 5,838,771 * | 11/1998 | Moeller .................................. 379/45 |

* cited by examiner

Primary Examiner—Wing F. Chan
(74) Attorney, Agent, or Firm—R. William Graham

(57) ABSTRACT

A strobe light and emergency call warning device with remote activator includes, a telephone; a telephone service line; a portable strobe light having means for enabling at least of a remote signal activation and deactivation thereof; a remote activator capable of generating at least one of an activation and deactivation signal; and controller operably interconnecting a telephone line and a telephone for controlling connection therebetween, and further having a processor and memory operably associated therewith and for storing a predetermined number therein, a receiver for receiving the signal from the remote activator and for transmitting a signal to the portable strobe to cause one of activation or deactivation thereof, and further including a detector for detecting use of the telephone service line and responsive to the signal from the remote activator for assuring clearance of the telephone service line from said telephone and call generator for one of generating and terminating a call to the predetermined number in response to one of said activation and deactivation signal, and a power supply operably associated therewith.

7 Claims, 6 Drawing Sheets

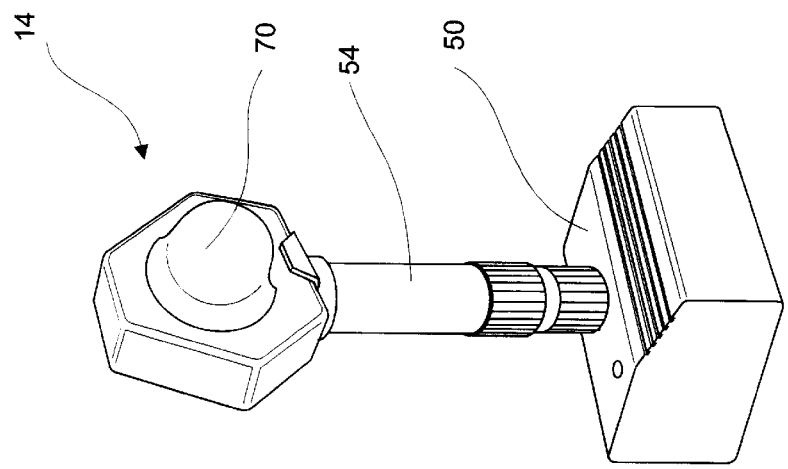
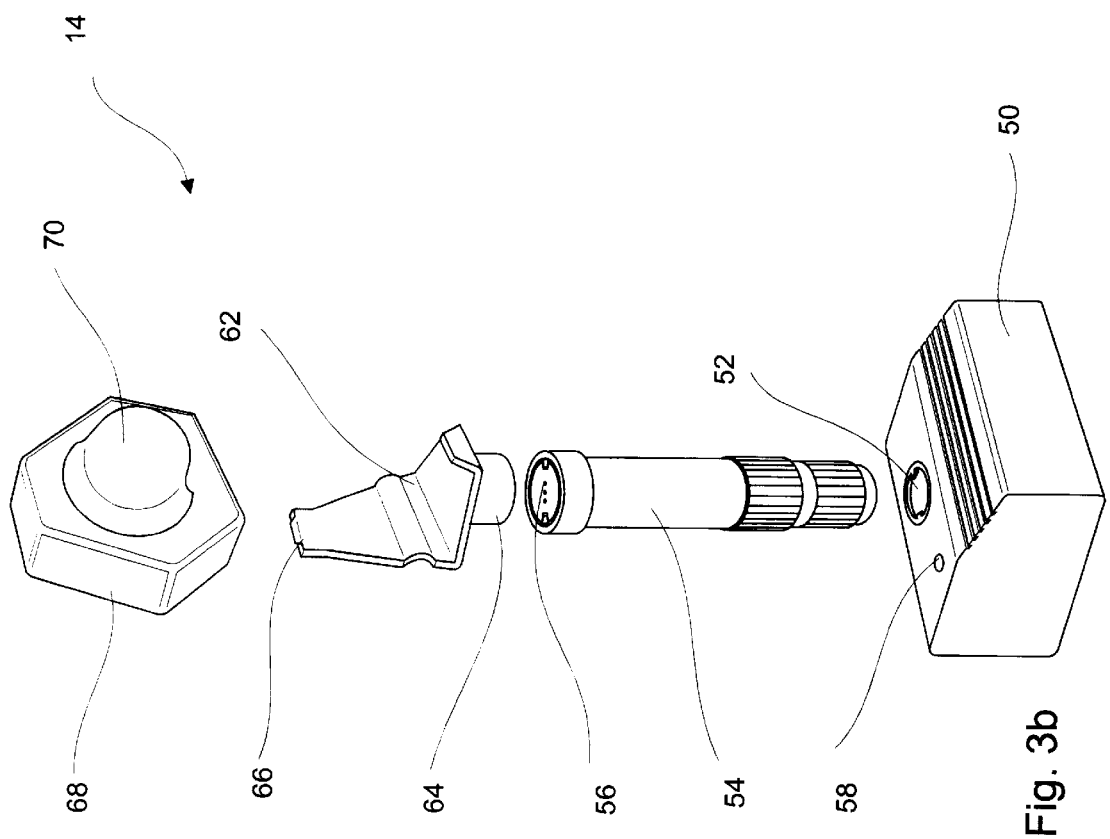

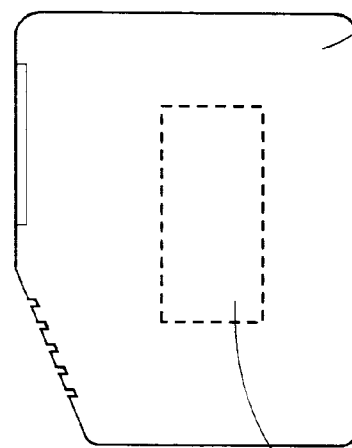
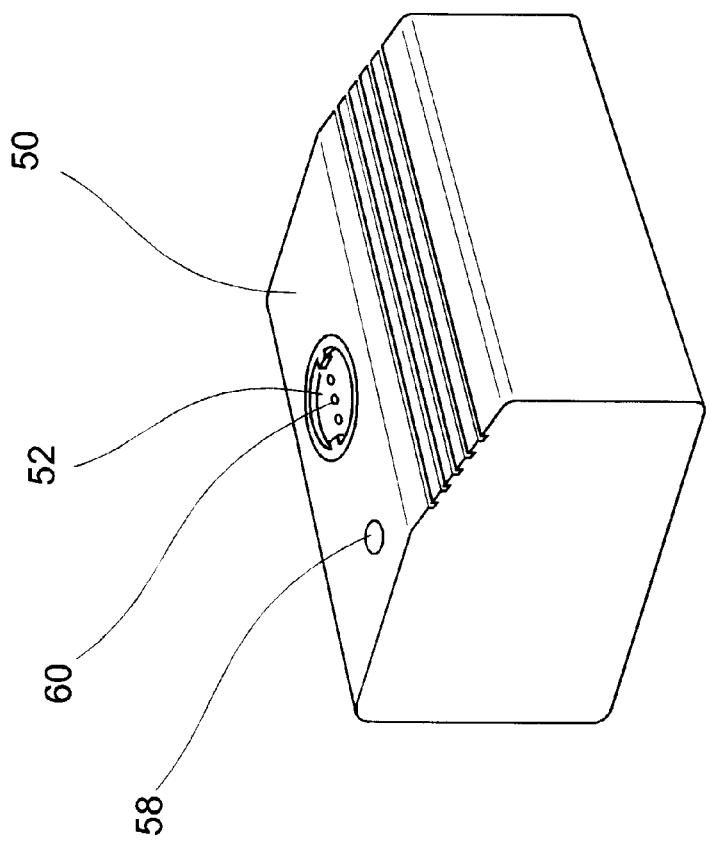
Fig. 4b
Fig. 4a

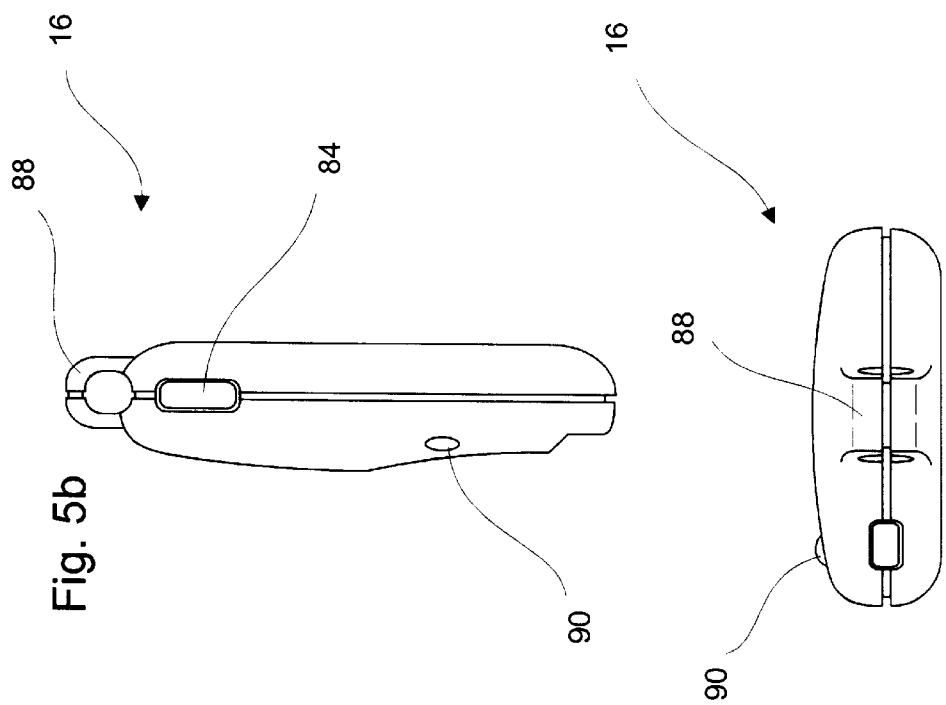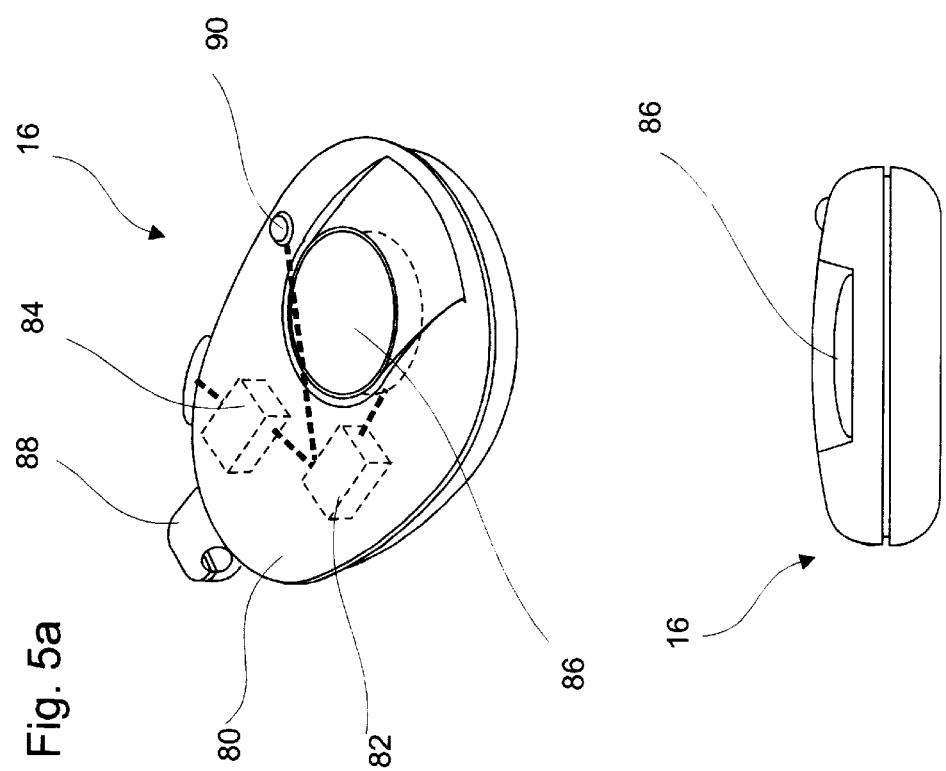

US 6,289,082 B1

STROBE LIGHT AND EMERGENCY CALL WARNING DEVICE WITH REMOTE ACTIVATOR

BACKGROUND OF THE INVENTION

1. Field of the Invention

The present invention pertains generally to the field of emergency warning and alarm systems and is more particularly directed to a strobe light and emergency call warning device with remote activator for domestic use which is actuated upon either of a remote control or dialing of a telephone number sequence associated with an emergency number and when actuated activates a strobe light preferably in an interior window of the premises for attracting and guiding a responder to the call.

2. Related Art

There are numerous times when an emergency occurs where time is of the essence and can save a life or prevent a crime from occurring. Accordingly, various systems have been employed including, 911 emergency assistance, as well as audible and visual alarms. These systems can be supported by a variety of communication companies so that dispatch personnel receiving a call at the 911 number is immediately provided with the street address at which the telephone call originates. The 911 dispatch sends the proper type of help in response to the call.

However, many times the addresses on the street are not visible or are not easily located. Emergency personnel responding to the call must search for a particular number in such cases. Naturally, the excess time poses potential loss of life, wellness and/or property.

Existing alarm systems feature activation of a light, upon triggering of the alarm system. Some systems actuate the alarm system in response to telephone dialing which places the call for assistance.

While present systems have decreased the risk of loss, there remains a need to improve warning systems capable of activating a locating device, such as a strobe light, and emergency telephone calls. It is desirable that such a system create a quicker response time and include improved notification system. This is due to the fact that in many circumstances, such as heart or lung failure, there is typically less than four minutes to resuscitate an afflicted person before brain function ceases to operate. Thus, every second counts.

SUMMARY OF THE INVENTION

It is an object to improve emergency warning and locating devices.

It is another object to improve emergency calling devices.

It is another object to simplify the use of emergency warning devices.

Accordingly, the present invention is directed to a strobe light and emergency call warning device with remote activator which improves over the art by use of a remote panic button which actuates a telephone box to trigger a series of telephone calls to one or more pre-designated emergency numbers while simultaneously initiating a strobe light. The telephone box includes means responsive to the remote panic button which clears the telephone line if busy in order to make the emergency calls.

The invention can be made available at low cost for easy installation by the purchaser to operate in a reliable manner thereby to expedite the delivery of emergency assistance services to the benefit of both the public and the municipal services responsible for providing such assistance. These and other advantages of the present invention will be better understood by reference to the accompanying detailed description of the preferred embodiments considered together with the attached drawings.

BRIEF DESCRIPTION OF THE DRAWINGS

FIG. 3a is a perspective of the strobe light the invention;

FIG. 3b is a perspective of the strobe light the invention in exploded view;

FIG. 4a is a perspective of a base the strobe light the invention;

FIG. 4b is an end view of the base the strobe light the invention;

FIG. 5a is a perspective of the remote panic button activator for use with the invention;

FIG. 5b is a side view of the remote panic button activator for use with the invention;

FIG. 5c is an end view of the remote panic button activator for use with the invention; and FIG. 5d is another end view of the remote panic button activator for use with the invention.

DETAILED DESCRIPTION OF THE PREFERRED EMBODIMENT

Figure 1:
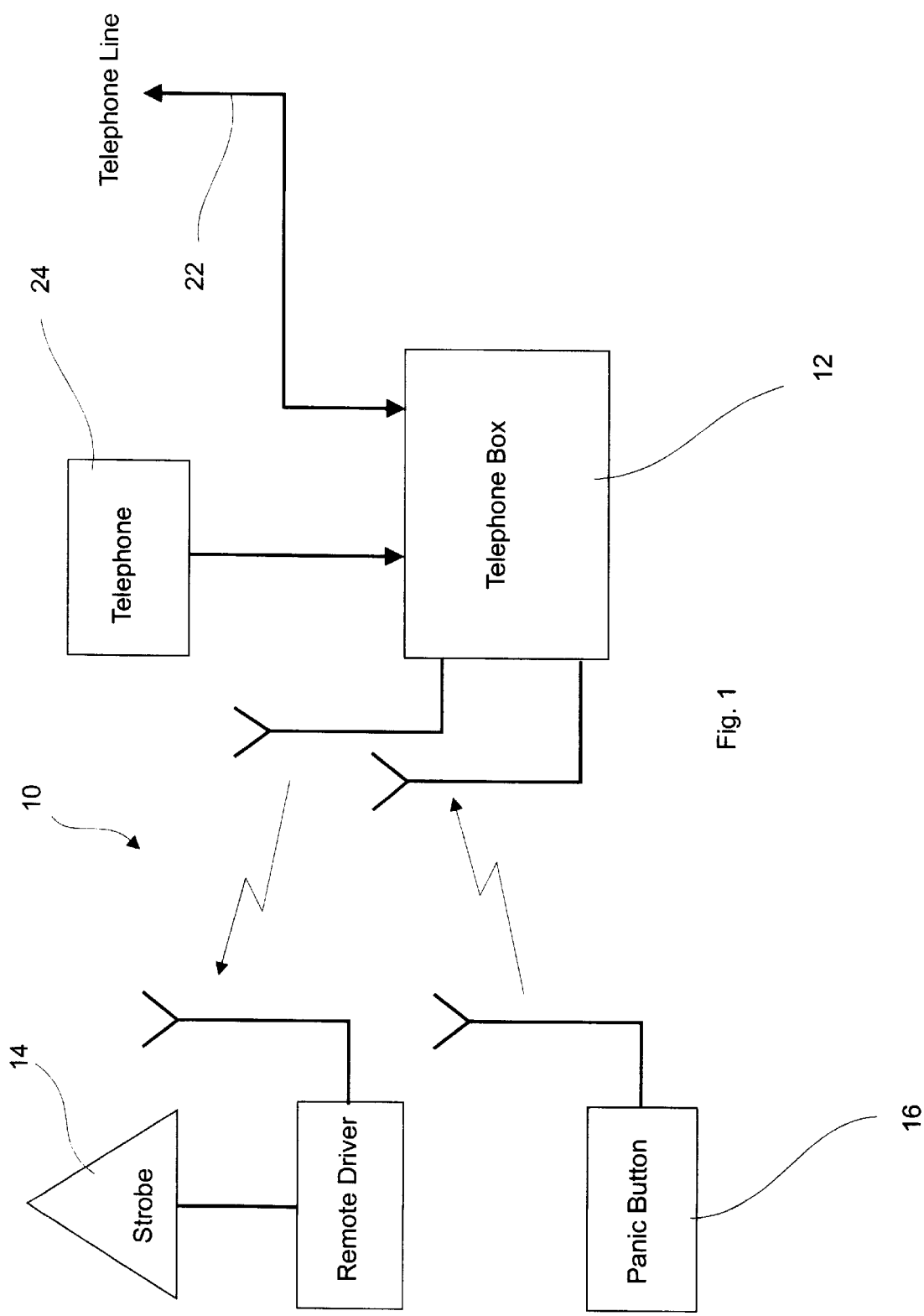
FIG. 1 is a schematic of a strobe light and emergency call warning device with remote activator according to this invention.

Referring now to the drawings, wherein like parts are identified by like numbers, FIG. 1 shows a schematic of the strobe light and emergency call warning device with remote activator 10. The device 10 generally includes a telephone light activator box 12 which includes circuitry more fully described hereinafter to accomplish the invention, a strobe light 14 and remote panic button activator 16.

Figure 2C:
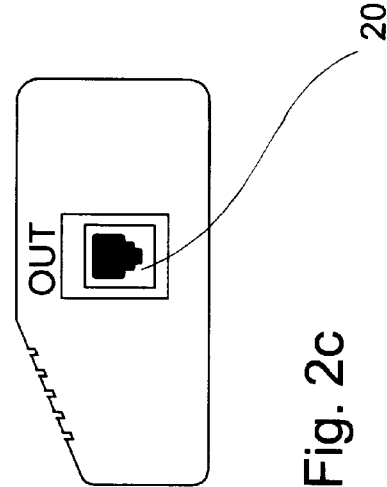
FIG. 2c shows another end view of the telephone strobe light activator box of the invention.
Figure 2A:
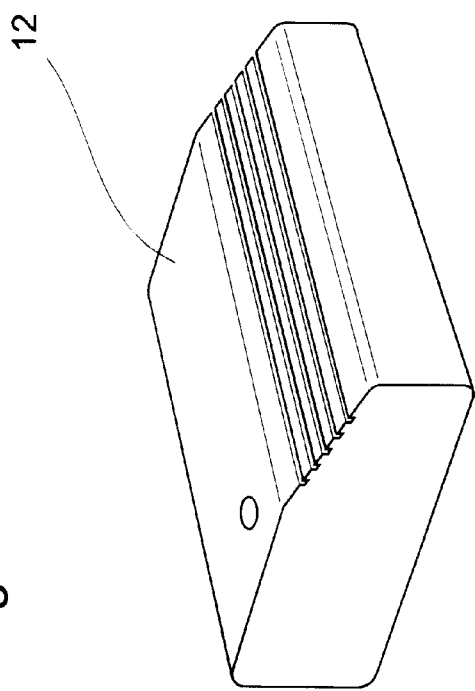
FIG. 2a shows a perspective view of the telephone strobe light activator box of the invention.
Figure 2B:
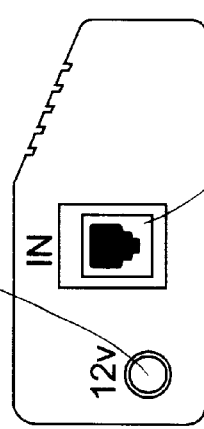
FIG. 2b shows an end view the of telephone strobe light activator box of the invention.
Figure 2D:
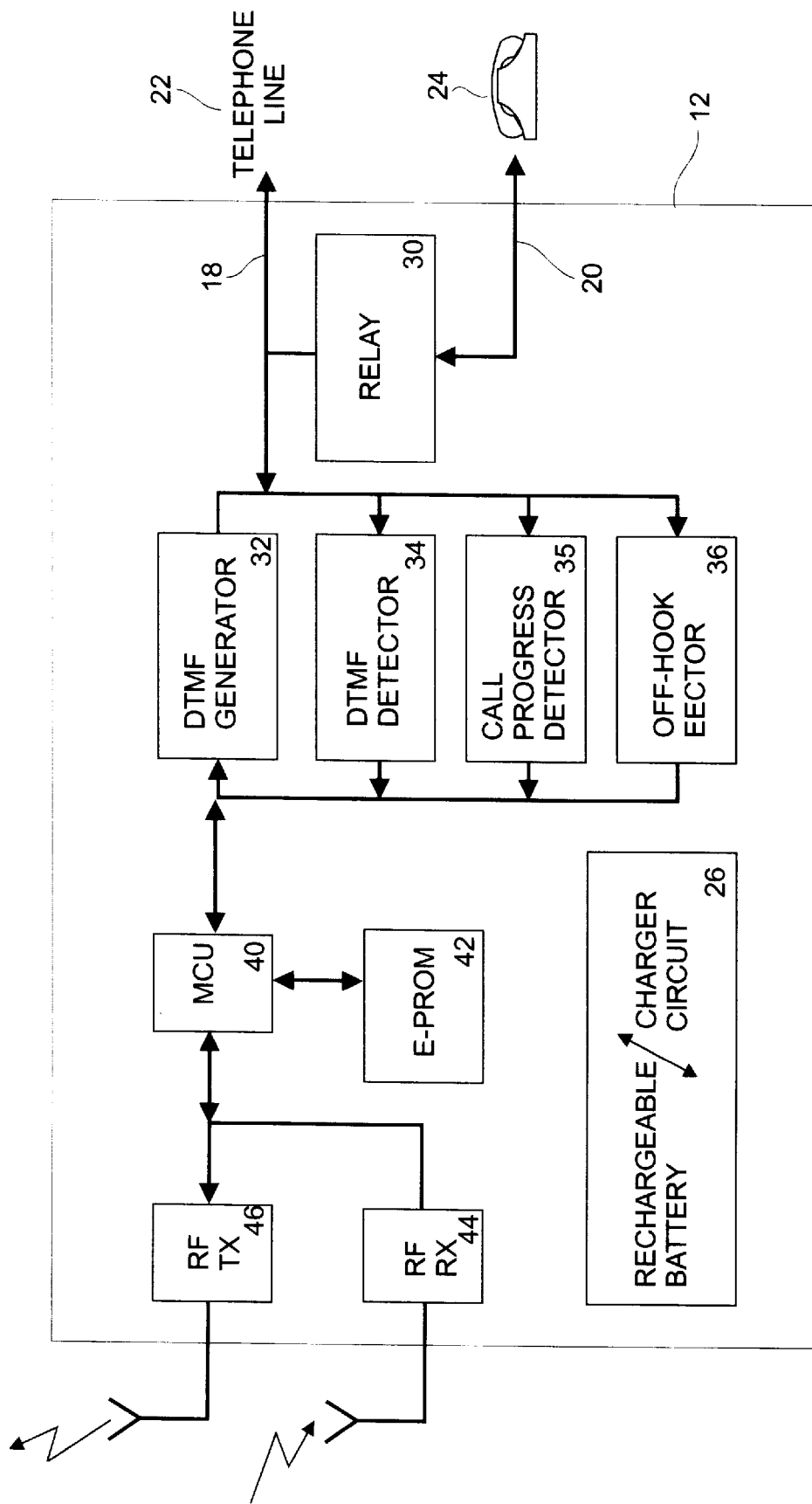
FIG. 2d shows a schematic of the telephone strobe light activator box of the invention

The telephone light activator box 12 (FIGS. 2a, 2b, 2c, and 2d) is equipped with telephone jack ports 18 (In-Line from telephone service line 22) and 20 (Out-Line to connect to telephone 24). The telephone light activator box 12 includes a power source 26 which can include an AC adapter (e.g., 110 V AC) and/or DC battery source which can optionally can be of a rechargeable type. A relay 30 operably interconnects the ports 20 and 18 to a DTMF generator 32, DTMF detector 34, call progress detector 35 and off-hook detector 36, in a manner as shown in FIG. 2d.

"DTMF" refers to dual tone multi frequency. Operably connected to the DTMF generator 32, the DTMF detector 34, the call progress detector 36 and the off-hook detector 38 is a microprocessor (MCPU) 40. The off-hook detector 38 is equipped with electrical circuitry to detect changes in the voltage of the telephone service line 22. If the telephone is off-hook, the voltage will drop, for example, from 48V to 8V, and be detected.

The call progress detector 35 includes electrical circuitry to detect dialing tone, ringing tone, busy tone, and communicate the same to MCPU 40. The MCPU 40 is equipped with software which recognizes predetermined emergency telephone numbers and whether such calls are completed thereto. The DTMF detector 34 detects which number is dialed from the phone 24 (in the event the phone is utilized) and communicates the dialed number signal to the MCPU 40. The DTMF generator 35 is used to generate the dual tone in tone dialing when the telephone box makes an emergency call, e.g., the DTMF generator 35 can call "911."

An electrical erasable programmable read only memory (EPROM) 42 is operably connected to the MCPU 38. The EPROM 42 is used to store the telephone number for making the emergency call. Also, a radio frequency receiver RFRX 44 and transmitter RFTX 46 are operably connected to the MCPU 40 to receive and transmit radio frequency signals, respectively. The MCPU 40 and EPROM 42 are operably associated with digital sound recording/playing chip 43 to permit recording of an emergency message to be played upon completion of a call to the emergency number dialed.

The strobe light 14 is preferably of a portable type to be disposed on a window sill interior of a building and includes a base 50 which here is shown to be of a rectangular configuration suitable for disposing on a window sill. Formed in an upper portion of the base 50 is a seating column surface 52 to receive a strobe light column support column 54 which preferably houses a battery 56. Also, connected to the base 50 in an exposed manner is a battery low indicator light 58 which is operably connected to the seating surface 52 via an electrical circuitry 60 which triggers the light upon the battery charge state falling below a predetermined amount. An audible battery low indicator can also be employed. A receiver/driver 51 is operably disposed within the base 50 to cause completion of a circuit when receiving a signal from the RFTX 46. The RFTX 46 is used to send the signal to the remote receiver 51 within the base 50 and turn on the strobe light 14. The RFRX 44 receives a signal from the panic button remote activator 16. A strobe light seat 62 includes a lower portion 64 having suitable electrical circuitry 66 to carry the current to from the battery 56 to the strobe light housing 68. Within the strobe light housing 68 is a strobe light 70. Here, the strobe light housing 68 is configured to hold the strobe light 70 in a manner which directs the light substantially from one side of the housing 68 such that when the strobe light 14 is disposed on a window sill, the light substantially projects out the window of the building.

The panic button activator 16 of the invention includes a housing 80 having a battery 82 operably disposed therein. An RFTX 84 is also operably disposed within the housing 80 and upon receiving power from the battery 82 sends a signal to the RFRX 44 of the box 12. A depressable button 86 is operably connected through an open surface of the housing via biasing means, which can be a spring loaded connector, and includes circuitry which when depressed completes a circuit from the battery 82 to cause the said transmission of the signal. A loop hoop 88 is integrally formed on the housing 80 to enable attachment to a chain or lace, for example, to be easily carried by the user. A low battery light indicator 90 with suitable circuitry are operably connected to the battery 82 and illuminates when the charge falls below a predetermined amount.

The operation and mock testing of the unit are further described as follows. The operation presumes a predetermined number e.g., "911" is stored in the EPROM. "#1" will allow a second number to be stored for calling. "##" will allow one to delete the second number. The ability to store numbers is provided while in the test mode with the telephone in the off-hook position. Subsequent to dialing the number, the there will result a beep for 1 second indicating the number is stored in the EPROM 42 "#2" will permit start/stop of a recorded message. "#3" will permit deletion of the message. Placing the telephone 24 in the on-hook position terminates the ability to store numbers.

When the telephone 24 is off hook, the off hook detector 36 and call progress detector 35 will detect the drop in voltage and dial tone and send signals to the MCPU 40. Upon receiving these signals, the MCPU 40 via its resident software comparatively analyzes the number(s) dialed with those stored in the EPROM 42. In the embodiment described, a preprogramed number such as "*1" the telephone box 12 initiates a panic button test mode and delivers a series of short audible sounds (e.g., two beeps). If "*2" is dialed, the telephone box 12 initiates a test mode for the telephone box 12 to dial "911" and delivers a long audible sound (beep). If "**" is dialed, the telephone box will toggle on and off the strobe light 14 via the mechanisms described above. If "911" or another predefined emergency number is dialed, the telephone box 12 will activate the strobe light 14.

While in test mode, the telephone box 12 is equipped with an audio chip operably connected to the MCPU 40 which periodically beeps until receiving an RF signal from the remote panic button activator 16 or when the telephone 24 is back on-hook. During the test, the relay 30 is in an open state which results in the disconnect of the telephone 24 from the telephone line 22.

The telephone box 12 will dial a predefined number e.g., "*0123456789" and the call progress detector 35 and DTMF detector 34 will detect the status of the telephone line and the number dialed by the DTMF generator 32, respectively. If the line status and number dialed are in order, the telephone box 12 will produce a long beep, e.g., 2 seconds, otherwise the telephone box 12 will produce short beeps for e.g., 4 seconds.

When the panic button is used in used to actuate on/off the device 10, an RF signal is sent to the telephone box 12 which in turn sends an RF signal to the strobe light 14. The MCPU 40 verifies that the telephone service line 12 is clear to dial the emergency number(s) in storage. If busy, the MCPU 40 communicates in a manner to clear the line through the relay 30. The DTMF generator 32 is initiated to call the emergency number. If the receiving number is busy, a redial is initiated periodically until the number is connected. Thus, the invention provides for the telephone box 12 to receive an RF signal from the panic button activator 16, an RF signal is transmitted to activate the strobe light 14. The MCPU 40 signals the relay 30 to the open position to clear a line 22. Once a dialing tone is present, the DTMF generator 32 initiates the emergency call number. The call progress detector 35 communicates with the MCPU 40 the status of the call until complete. Once complete, the emergency message is initiated by the MCPU 40 to cause the playing of the message via chip 43.

The above described embodiments is set forth by way of example and is not for the purpose of limiting the present invention. It will be readily apparent to those skilled in the art that obvious modifications, derivations and variations can be made to the embodiment without departing from the scope of the invention. Accordingly, the claims appended hereto should be read in their full scope including any such modifications, derivations and variations.

What is claimed is:

1. A strobe light and emergency call warning device with remote activator, comprising:

a telephone;

a telephone service line;

a portable strobe light having means for enabling at least one of a remote strobe activation signal and a remote strobe deactivation signal thereof;

a remote activator capable of generating at least one of a controller activation signal and a controller deactivation signal; and control means operably interconnecting a telephone line and a telephone for controlling connection therebetween, and further having a processor and memory operably associated therewith and means for storing a predetermined number therein, means for receiving said controller signal from said remote activator and for transmitting said strobe signal to said portable strobe to cause one of activation or deactivation thereof, and further including means for detecting use of said telephone service line and responsive to said signal from said remote activator for assuring clearance of said telephone service line from said telephone and means for one of generating and terminating a call to said predetermined number in response to one of said activation and deactivation signal, and a power supply operably associated therewith.

2. The strobe light and emergency call warning device with remote activator of claim 1, which further includes means for detecting when said predetermined number is dialed by said telephone; and means for recording a predetermined message and delivering said message upon said call being connected.

3. The strobe light and emergency call warning device with remote activator of claim 2, wherein said control means transmits an activation signal to said strobe light in response to one of a made and terminated call to said predetermined number made through said telephone.

4. The strobe light and emergency call warning device with remote activator of claim 1, which further includes an AC power supply and a backup DC power supply with means for indicating when said DC power supply is low.

5. The strobe light and emergency call warning device with remote activator of claim 1, wherein said control means further includes means for mock testing actuation of said remote activator and said strobe light.

6. The strobe light and emergency call warning device with remote activator of claim 1, wherein said control means transmits an activation signal to said strobe light in response to a made call to said predetermined number made through said telephone.

7. The strobe light and emergency call warning device with remote activator of claim 1, which further includes a call progress detector for detecting one of a call and busy signal, wherein said call generating means is capable of redialing said predetermined number upon receiving a busy signal on said telephone service line.

* * * * *